UNITED STATES PATENT OFFICE.

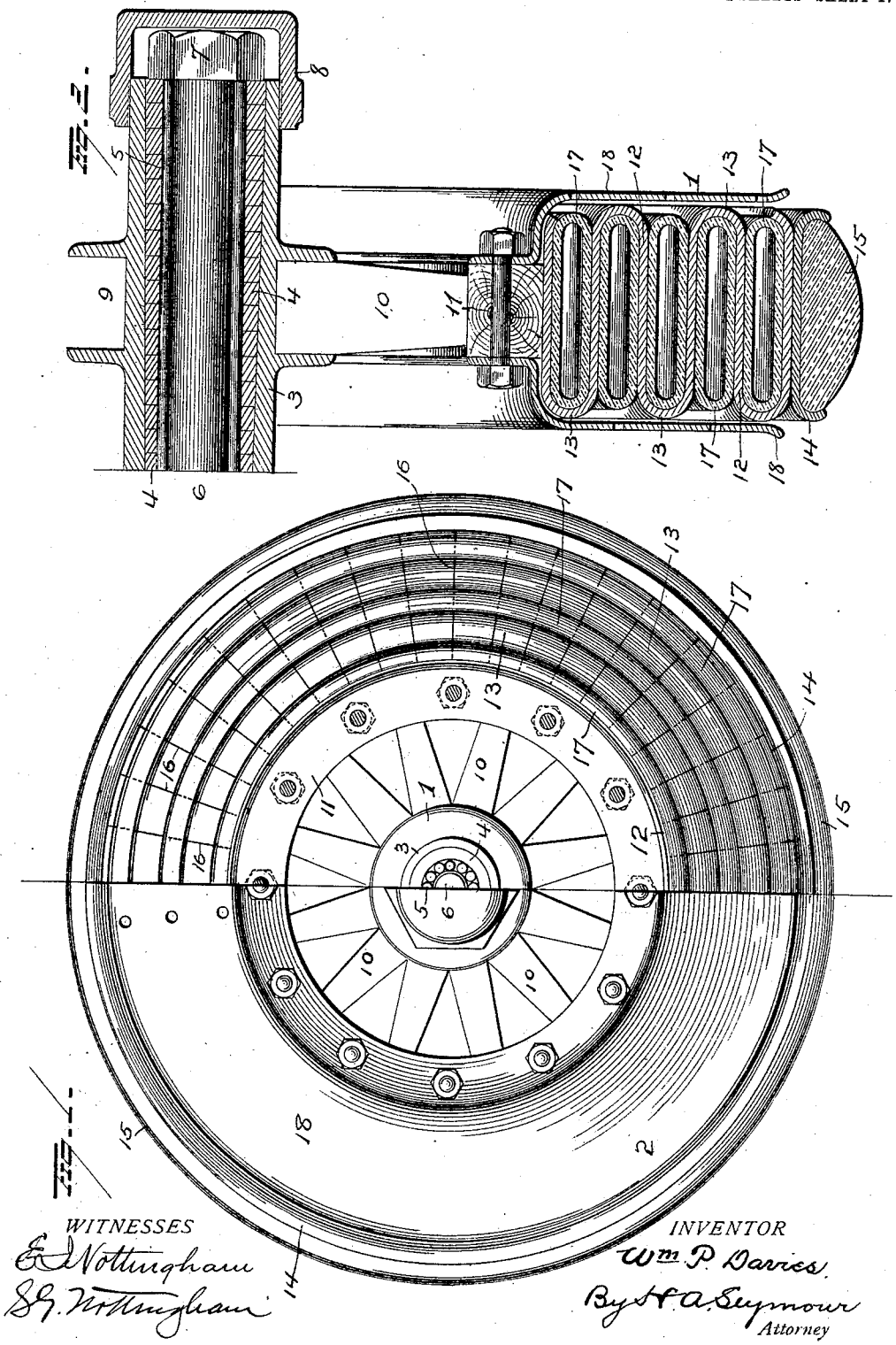

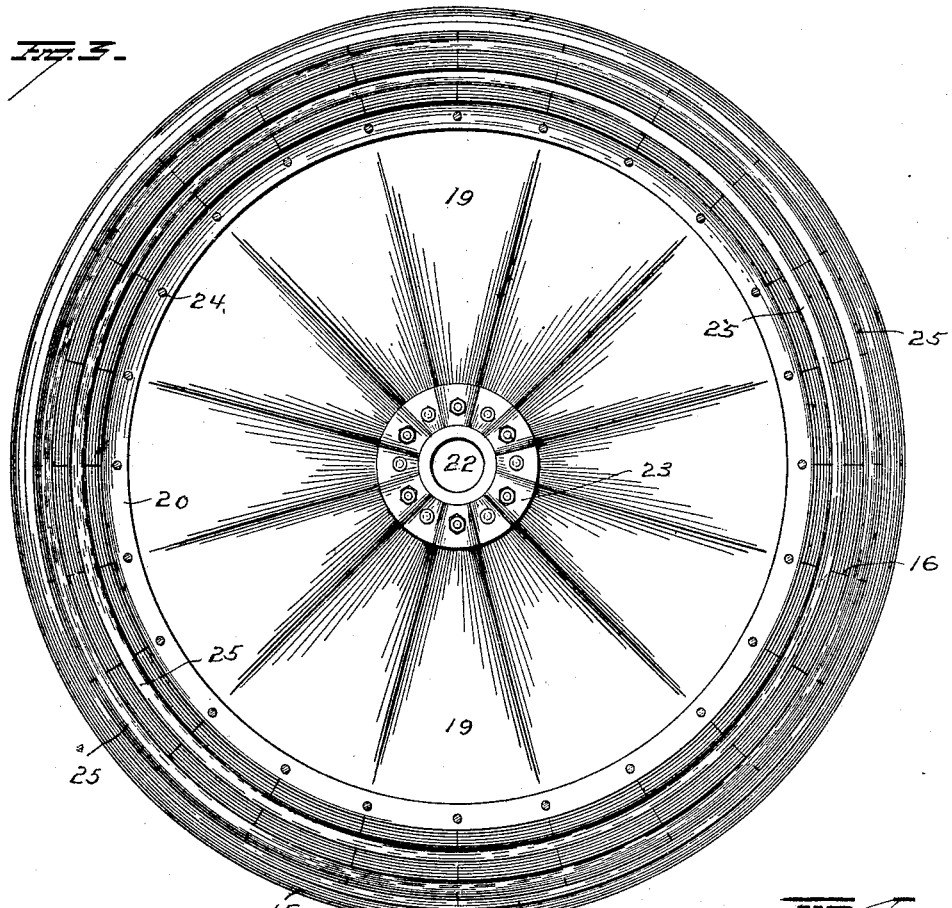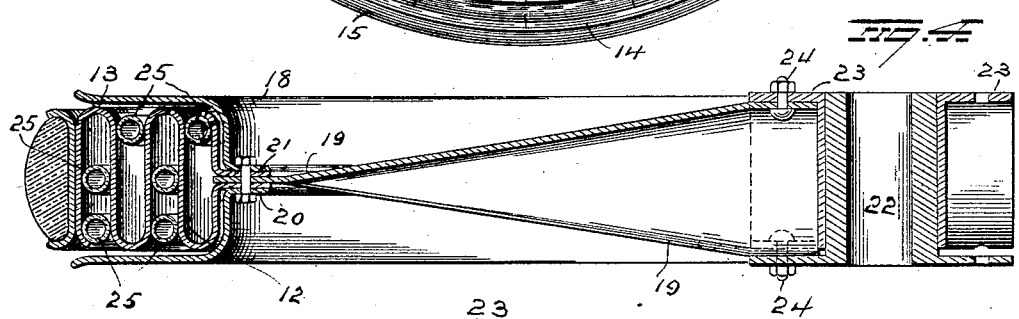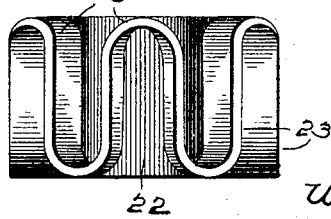

WILLIAM P. DAVIES, OF CINCINNATI, OHIO.

WHEEL.

940,584.  Specification of Letters Patent.  Patented Nov. 16, 1909.

Application filed August 6, 1907. Serial No. 387,326.

*To all whom it may concern:*

Be it known that I, WILLIAM P. DAVIES, of Cincinnati, in the county of Hamilton and State of Ohio, have invented certain new and useful Improvements in Wheels; and I do hereby declare the following to be a full, clear, and exact description of the invention, such as will enable others skilled in the art to which it appertains to make and use the same.

My invention relates to an improvement in wheels and more particularly to such as employ elastic tires,—the object of the invention being to so construct the wheel that its tire portion shall be elastic and avoid danger of puncture and which may embody as a portion of its structure one or more cushions.

A further object is to so construct the tire portion of a wheel that the combined elasticity of a spring and elastic tubing or cushion can be utilized.

With these objects in view the invention consists in certain novel features of construction and combinations of parts as hereinafter set forth and pointed out in the claims.

In the accompanying drawing, Figure 1 is a face view (partly broken away) of a wheel embodying my improvements. Fig. 2 is a partial transverse sectional view. Fig. 3 is a face view of a wheel embodying certain modifications. Fig. 4 is a transverse sectional view of the wheel shown in Fig. 3, and Fig. 5 is a peripheral view of the hub 22.

1 represents the body portion of the wheel and 2 the tire portion. The body portion 1 comprises a hub 3 having a tapering interior, within which a series of rings 4 are disposed which constitute a bushing against which anti-friction rollers 5 have a bearing. A shaft or axle 6 projects through the bushing within the series of anti-friction rollers, and is provided at its free end with a nut 7 by means of which the ring-bushing can be moved longitudinally within the hub and compensate for wear. The end of the shaft or axle and the nut thereon are protected by means of a cap 8 secured to the hub. The hub 3 is provided with a series of sockets 9 for the reception of spokes 10 and to the outer ends of these spokes a felly 11 is secured.

The tire portion of the wheel comprises a plate of spring metal 12, bent to form a series of annular corrugations 13. A shoe 14 encircles the corrugated spring plate 12 and retains in place a suitable tread portion 15. In order that this spring tire shall be permitted to yield where pressure is applied without unduly displacing other portions of the tire, the corrugated spring plate 12 is split radially at a number of places, as indicated by the lines 16 on Fig. 1. Between the corrugations of the spring tire, rubber cushions 17 are located.

To each side of the felly 11 a plate 18 is securely bolted. These plates embrace the spring tire and serve to prevent displacement of the rubber cushions interposed between the convolutions of the spring, and also, to strengthen or support the said spring tire laterally.

Instead of constructing the body portion of the wheel with spokes, the said body-portion may comprise a single corrugated plate 19, as shown in Figs. 3, 4 and 5. That portion of the corrugated plate 19 in close proximity to the periphery thereof is made plain and has secured thereto the depending portion 20 of the inner convolution of the spring tire. The latter is also supported on the plate 19 by means of a flanged ring 21 secured thereto. In the construction shown in Figs. 4 and 5 the hub 22 of the wheel is provided with a peripheral serpentine flange 23 which forms seats for the reception of the corrugated body portion 19 of the wheel and said hub and body portion are secured together by means of bolts 24.

In Fig. 4 I have illustrated a series of cushions 25 in the form of tubes, and if desired several such tubes may be disposed in each corrugation of the spring.

Other slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. A wheel provided with a tire portion comprising a spring plate bent to form a series of annular corrugations superimposed radially and cushions interposed between said corrugations.

2. A wheel provided with a tire portion comprising a spring plate bent to form a series of annular corrugations, cushions interposed between said corrugations, and plates embracing said corrugated spring plate and preventing lateral displacement thereof and of said cushions.

3. In a wheel, the combination with a body portion including a felly, of a tire portion comprising a spring plate bent to form a series of superimposed annular corrugations and seated on said felly, and cushions interposed between the corrugations of the spring plate.

4. In a wheel, the combination with a body portion including a felly, of a tire portion comprising a spring plate bent to form a series of annular corrugations and seated on said felly cushions interposed between the corrugations of said spring plate, and plates secured to the felly and embracing the corrugated spring plate and interposed cushions.

In testimony whereof, I have signed this specification in the presence of two subscribing witnesses.

WILLIAM P. DAVIES.

Witnesses:
S. HARTE,
JOSEPH L. LOGAN.